United States Patent [19]

Goupil et al.

[11] 4,052,499

[45] Oct. 4, 1977

[54] METHOD OF REINFORCING THE HANDLE OF HOCKEY STICKS

[76] Inventors: Marcel Goupil, 948 Chasse Street; Gaston Ruel, 265 Lemire Boulevard; Marc Ruel, 124 Biron Street, all of Drummondville, Quebec, Canada

[21] Appl. No.: 593,654

[22] Filed: July 7, 1975

[30] Foreign Application Priority Data

Aug. 16, 1974 Canada .................................. 207171

[51] Int. Cl.² ............................................. B29D 3/02
[52] U.S. Cl. .................................... 264/265; 264/137; 264/251; 264/254; 264/266; 273/67 A
[58] Field of Search ............... 264/136, 137, 251, 254, 264/257, 258, 266, 259, 265, 246, 247; 273/67 A, 73 F

[56] References Cited

U.S. PATENT DOCUMENTS

| 1,186,692 | 6/1916 | Siggins et al. ..................... 264/266 X |
| 2,749,266 | 6/1956 | Eldred .................................. 264/137 |
| 3,205,288 | 9/1965 | Bates .................................. 264/254 X |
| 3,657,040 | 4/1972 | Shobert ............................. 264/137 X |

FOREIGN PATENT DOCUMENTS 591,454  1/1960  Canada .............................. 273/67 A Primary Examiner—Jan H. Silbaugh

[57] ABSTRACT

Method of reinforcing the handle of hockey sticks by molding against opposite sides of the handle a layer of synthetic resin in which are embedded reinforcing fibers extending longitudinally of the handle. These layers are bevelled along their opposite edges.

4 Claims, 7 Drawing Figures

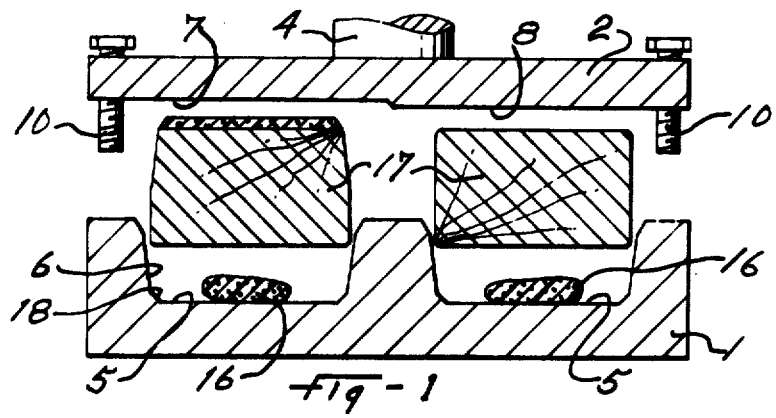
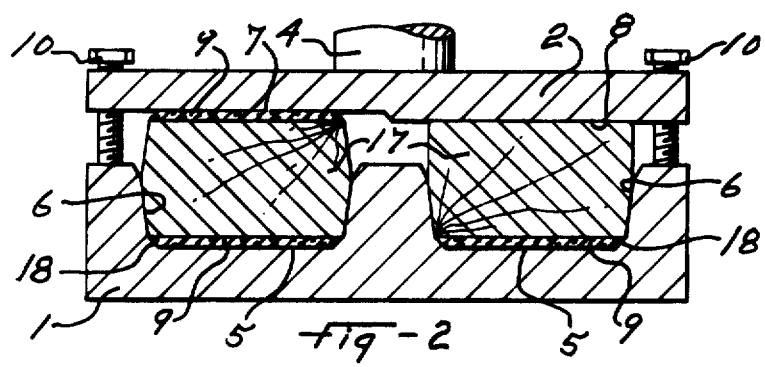
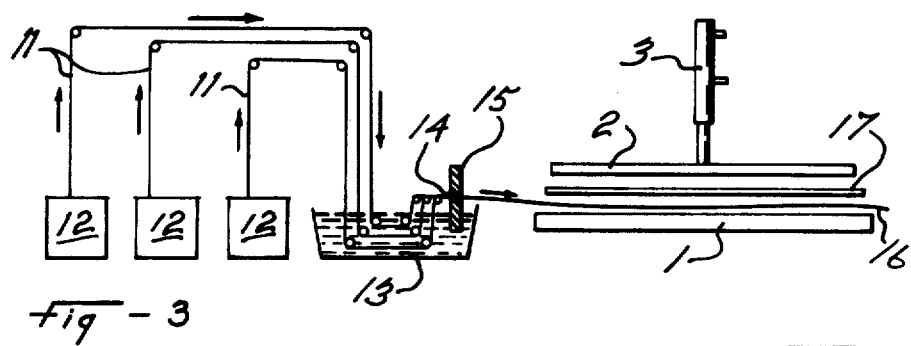
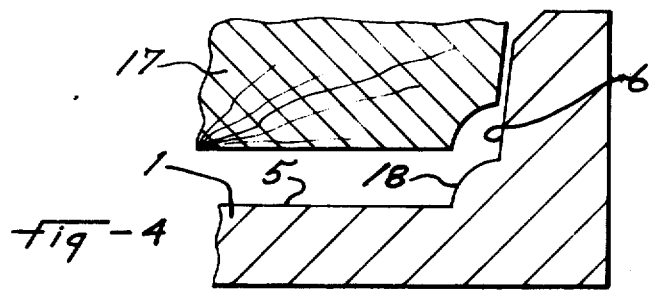

METHOD OF REINFORCING THE HANDLE OF HOCKEY STICKS

This invention relates to the art of hockey sticks and, more particularly particularly, to a method of reinforcing the handle of a hockey stick.

Hockey sticks with a reinforced handle have been proposed so far but with little consideration, if any, to the performance that these handles would be able to achieve with regard to their weight, cost and desired resilience. In particular, there has been proposed to cover all sides or faces of the handle of a hockey stick with a laminate facing secured by glue or adhesive. This appears to have been done inefficiently so far, in particular by failing to concurrently improve the weight and cost factors.

It is a general object of the present invention to provide a method of reinforcing the handle of a hockey stick which is simpler and highly economical and which improves the resilience characteristics thereof, and in particular the balance between the resiliences in two planes orthogonally intersecting through the handle.

It is a more specific object of the present invention to provide an improved method of reinforcing the handle of a hockey stick by simultaneously molding said adhering to the faces of said handle a layer of a resin impregnated roving of longitudinally extending reinforcing fibers and thus producing much finer end products than with previous "glue and adhesive" methods while decreasing the need of finishing operation, such as sanding. It is a still more specific object of the invention to provide a method of reinforcing the handle of a hockey stick which simultaneously improves the handgrip.

It is another object of the invention to provide a method of making reinforcing the handles of hockey sticks which results in dimensionally more uniform and straighter handles due to the molding action on the handles as well as on the lateral layers.

The above and other objects and advantages of the present invention will be better understood in the light of the following detailed description of preferred embodiments thereof which are illustrated, by way of example, in the accompanying drawings, wherein:

FIGS. 1 and 2 are transverse cross-sectional views through a mold before and after the molding operation respectively;

FIG. 3 is a schematic illustration of the assembly to perform the molding on hockey stick handles according to the present invention;

FIG. 4 is an enlarged cross-sectional view illustrating the operative relationship between a handle and a mold, both adapted to cooperative produce an edge of predetermined cross-section for improved handgrip.

Figure 5:
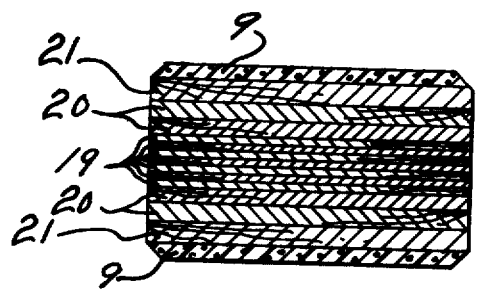
FIGS. 5, 6, and 7 illustrate cross-sections of three distinct embodiments of handles of hockey sticks obtained by the molding method of the present invention.

According to the present invention, handles of hockey sticks are reinforced in a mold 1 and using press plate 2, both of which are elongated approximately the length of a handle of a hockey stick. The mold 1 may be fixedly mounted on any appropriate support, while the movable plate 2 is displaceable toward and away from the mold 1 by the action of one or more hydraulic cylinders 3 including a piston rod 4. The mold 1 has a pair of cavities 5 therein which are open at the top and which each have a transverse cross-sectional shape corresponding to the cross-sectional final shape of the handle of the hockey stick. As can be seen in FIGS. 1, 2, and 4, the bottom of each cavity is transversely flat and the lateral sides 6 flare upwardly towards the open top of the cavity to allow easy insertion and removal of the stick handle into and from the mold cavity 5.

The press plate 2 is formed with a pair of flat surfaces 7 and 8 which are arranged in planes which are spaced apart one from the other a distance equal to the desired thickness of a layer 9 of resin covered reinforcing fibers. Adjustment screws 10 are threaded through the press plate 2 and adapted to abut against the top of the mold 1, whereby selective screwing or unscrewing of these screws 10 allows selective adjustment of the thickness of the layers 9. It is also possible to produce satisfactory molding without the use of adjustment screws by pushing press plate 2 with sufficient force against the stick handle to ensure proper distribution of the liquid thermosetting resin across the face of the stick handle.

According to the method of the present invention, the desired member of fibers 11, such as of fiberglass, are drawn from an appropriate supply thereof, indicated by the three blocks 12 in FIG. 3. These reinforcing fibers are then passed through a bath 13, of suitable resin, preferably a resin of the thermosetting type which is also self-adhesive such as to adhere itself to the handle of the hockey stick without use of a separate adhesive. The selected mumber of fibers which have been covered with the resin are thereafter joined to form a roving which is passed through a hole 14 of predetermined size in a plate or the like 15 to remove excess resin.

The roving 16, of resin-covered reinforcing fibers, is thereafter laid longitudinally on the bottom of one cavity 5 to extend the full length thereof. After a roving 16 has been placed into each cavity 5, a hockey stick handles of predetermined cross-section, is placed in each cavity with one of the two faces parallel to the blade of the hockey stick positioned substantially parallel to the bottom of the molding cavity 5. It must be noted that in the cavity 5 underlying the surface 8, a stick 17 having both lateral faces nude is placed, while in the other cavity 5, there is placed a stick 17 having one layer 9 already set against one face thereof, as shown in FIG. 1.

A resilient strip or cushion, each as of rubber, (not shown) may be laid over the top face of the handles 17. The press plate 2 is then lowered or pressed against the top facing handles 17, thus the edges of the underface of the stick engage side walls 6 of cavities 5 and seal the molding spaces formed by the cavities 5 and handles 17. The handles 17 press rovings 6 and cause their transversal flattening and their complete filling of the molding spaces resulting in layers 9, as shown in FIG. 2, which adhere to the corresponding face of the handles 17. Concurrently, the handles 17 which are preferably made of compressible material, such as wood, are correspondingly shaped by the faces 6 of the mold to provide improved handgrip on the handle of the hockey sticks. The cavities 5 include corners 18 to form corresponding transversely bevelled edges along the opposite lateral edges of the layers 9. The afore-mentioned cushion serves to ensure more uniform spreading of these layers against the corresponding sides of the sticks.

As shown in FIG. 4, the corners 18 may have different transverse outlines such as flat, concave, convex, etc.

FIG. 5 illustrates a cross-section through the handle of a hockey stick wherein the core is made of plywood and more precisely of laminated wood including 7 central laminates 19, of poplar, two laminates 20, of birch, against each side of these 7 laminates, and one outer laminate 21, of poplar, against the exterior side of the laminates 20. In a closely related embodiment, not shown, the hockey stick may be made with a core of plywood or laminated wood therein the laminates extend transversely of the reinforcing layers instead of parallel thereto, as shown in FIG. 5. This provides increased lateral rigidity even with a relatively reduced quantity of reinforcing fibers.

Figure 6:
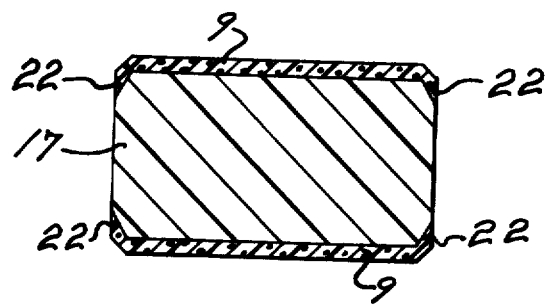

In the embodiment of FIG. 6, the handle 17 is made of foam plastics which is provided with the layers 9 but with the latter having cornering projections 22 which provides the necessary rigidity and resilience in the direction of the layers 9.

Figure 7:
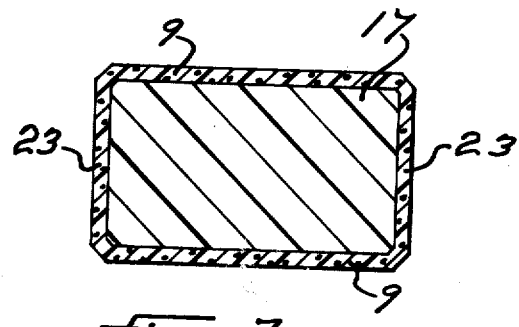

In the embodiment of FIG. 7, the core 17 is again made of foam plastics but, this time, the rigidity and resilience in the direction of the layers 9 are assured by molding layers 23 against the other two sides of the handle 17.

It must be noted that any of the above-mentioned types of hockey stick handle may be covered with any of the afore-mentioned types of layers 9 with or without concurrent molding of the core 17 and with any suitable shape of the bevel 18.

The handle 17 may be made either of soft wood or low grade hardwood, such as for basswood, which is as light as a soft wood, such as pine. The laminated core with poplar laminates has more torsional force, requires less fibers and resin to produce a comparable hockey stick handle, and of more uniform quality.

The conventional hockey stick handle, made of ash wood, is twice as rigid in the plane of the blade than in the orthogonal plane relative to the latter. By using various combinations of low density wood, such as poplar or rigid foams, with high density and of high rigidity wood, such as birch as laminates in the handle, together with various amounts of reinforcing fibers and resin laterally of this handle, the rigidity of the handle can be widely varied while maintaining within acceptable limits cross-sectional dimensions of the handle and the weight of the stick.

After the press plate 2 has pressed the handle 17 against the roving 16 and flattend the latter, the layer 9 thus formed is thermoset by heating for a few minutes, causing hardening of the resin and firm adherence thereof against the handle 17. The press plate 2 is thereafter raised and the stick, or sticks, are removed. The incomplete stick is turned flat on the other side and placed in the other cavity 5 to replace the completed stick, which is removed and finished by simple trimming of the ends of the layers 9.

It has been found that a much better adherence can be obtained between the wooden hockey stick handle and the layer of thermosetting resin, preferably a polyester resin, if, prior to the moulding of the layer, the wooden handle is heated to a temperature of about 150°F. during two or six minutes and, preferably, three to four minutes. Not only the heated wooden core helps in the thermosetting of the resin, but also any humidity in the wood outer surface is dried out, whereby better adherence is obtained.

What we claim is:

1. The method of reinforcing the handle of a hockey stick comprising the steps of laying a roving of reinforcing fibers impregnated with uncured thermosetting synthetic resin longitudinally in the flat bottom of an elongated open top female solid having straight side walls flaring upwardly from said bottom and having corner faces at the junction of said bottom and side walls which are inclined relative to said bottom and side walls, using the handle of a hockey stick as a male molding part, said handle made of a compressible material selected from the group consisting of wood and foam plastic and having a substantially rectangular cross-section defining a pair of wider main faces and a pair of narrower and faces, positioning said handle longitudinally in said mold and with one main face of said handle substantially parallel to said bottom and with the longitudinal edges of said main face abutting the respective side walls of said mold and retaining said main face spaced from said bottom, thereby defining a molding space between said female mold and said handle, pressing said handle towards said bottom and against said roving to cause said side walls to engage said narrower end faces of said handle and compress said handle and seal said molding space along said side walls, and to cause said roving to flatten and to fill said molding space and to adhere to said handle main face, heat curing said resin, removing said handle from said female mold with the cured resin forming a flat layer covering and adhering to said face and having bevelled longitudinal edges, and said layer having said fibers embedded therein and longitudinally extending along said handle.

2. A method as claimed in claim 1, further including heating said handle prior to pressing the same against the resin-impregnated roving.

3. A method as claimed in claim 1, wherein said handle is made of wood and is heated to about 150°F. for at least two minutes before laying said handle against said roving.

4. A method as claimed in claim 1, wherein said fibers are glass fibers and said resin is a thermosetting resin capable of adhering to wood and to set the fibers.

* * * * *